(12) United States Patent
Mules

(10) Patent No.: US 7,695,618 B2
(45) Date of Patent: Apr. 13, 2010

(54) FILTER CARTRIDGE AND MOUNTING SYSTEM THEREFOR HAVING FOOLPROOFING MEANS

(75) Inventor: Robert Stephen Mules, Pontyclun (GB)

(73) Assignees: Filtrauto, Guyancourt (FR); Sogefi Filtration Ltd., Rhondda Cynon Taff (GB)

( * ) Notice: Subject to any disclaimer, the term of this patent is extended or adjusted under 35 U.S.C. 154(b) by 153 days.

(21) Appl. No.: 11/914,206

(22) PCT Filed: May 5, 2006

(86) PCT No.: PCT/FR2006/001012

§ 371 (c)(1),
(2), (4) Date: Nov. 12, 2007

(87) PCT Pub. No.: WO2006/120326

PCT Pub. Date: Nov. 16, 2006

(65) Prior Publication Data

US 2009/0008317 A1    Jan. 8, 2009

(30) Foreign Application Priority Data

May 13, 2005    (FR) .................................. 05 04867

(51) Int. Cl.
*B01D 27/08*    (2006.01)
*B01D 35/30*    (2006.01)

(52) U.S. Cl. ......................... 210/232; 210/444; 210/450

(58) Field of Classification Search ................. 210/232, 210/444, 450
See application file for complete search history.

(56) References Cited

U.S. PATENT DOCUMENTS

| 5,035,797 | A | * | 7/1991 | Janik | ......................... | 210/232 |
| 6,723,239 | B2 | * | 4/2004 | Maxwell | ..................... | 210/235 |
| 2003/0217958 | A1 | * | 11/2003 | Reid | .......................... | 210/232 |

FOREIGN PATENT DOCUMENTS

| DE | 10201456 | 7/2002 |
| EP | 0442365 | 8/1991 |
| EP | 1070530 | 1/2001 |
| JP | 07100307 | 8/1995 |
| JP | 09267005 | 1/1998 |
| WO | 02/89949 | 11/2002 |

* cited by examiner

*Primary Examiner*—Thomas M Lithgow
(74) *Attorney, Agent, or Firm*—McDonnell Boehnen Hulbert & Berghoff LLP

(57) ABSTRACT

A filter cartridge comprising a first attachment member (25) and suitable for attachment to a predetermined holder (2) that includes a second attachment member (26) engageable with the first attachment member (25). The cartridge comprises foolproofing means (31) engageable with second foolproofing means (32) connected to the predetermined holder (2) when the cartridge is mounted on the holder. A system for mounting said cartridge on the predetermined holder is also disclosed.

9 Claims, 3 Drawing Sheets

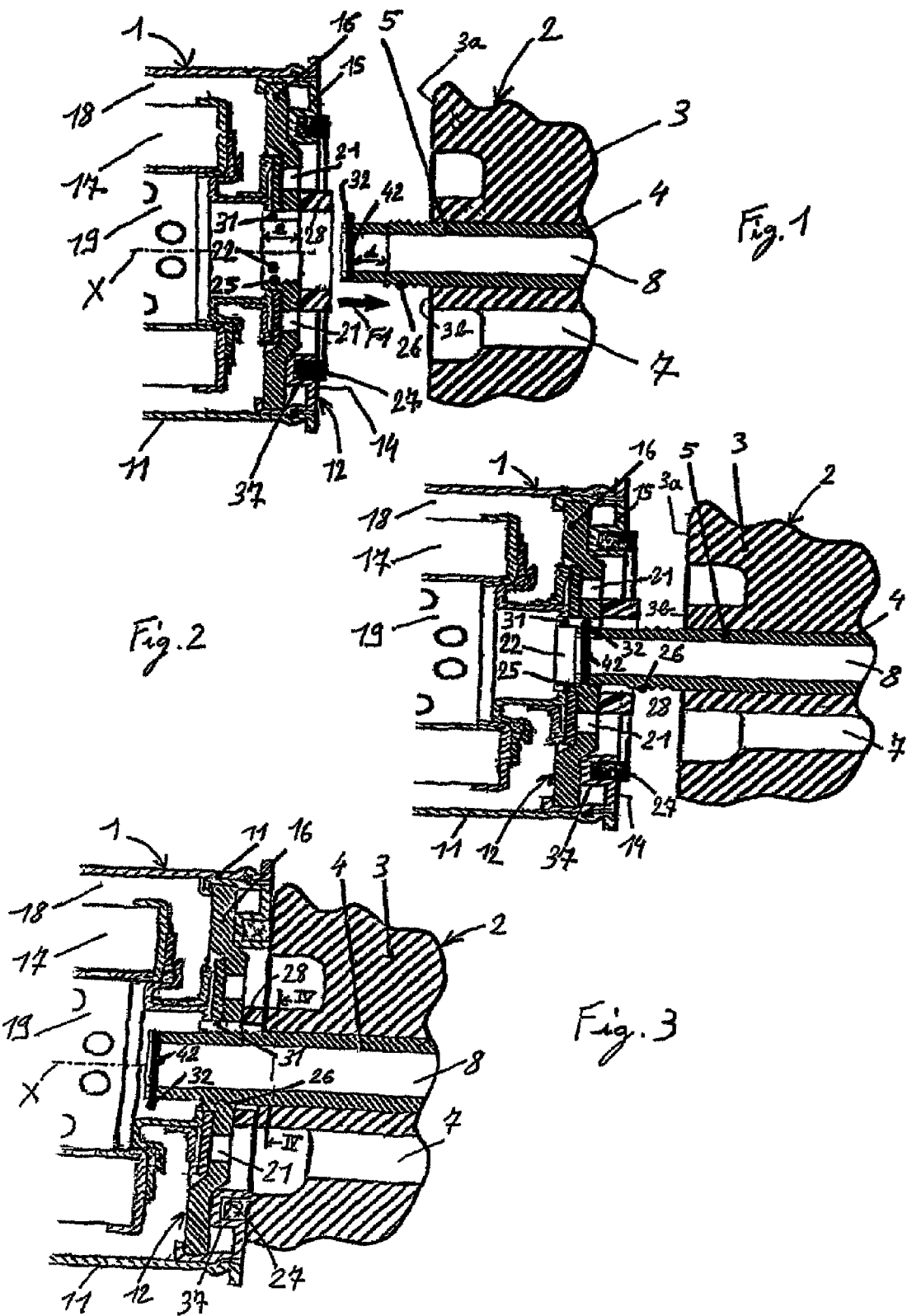

FILTER CARTRIDGE AND MOUNTING SYSTEM THEREFOR HAVING FOOLPROOFING MEANS

This invention relates to a filter cartridge comprising a first attachment device, the said cartridge being adapted to be fixed to a predetermined support that comprises a second attachment device adapted to come into contact with the first attachment device.

The first attachment device of the cartridge is usually in the form of a threaded element that can be screwed onto a second threaded element fixed to a support such as an engine block. These threaded elements are made with standard threads, such that different types of cartridges can be screwed onto the support of a given engine block. For a given engine, the cartridge must have predetermined characteristics as a function particularly of the flow, the pressure and the nature of the filtered liquid. Therefore with existing mounting systems, a user can accidentally mount an unsuitable cartridge onto the predetermined engine thus causing bad operation of the engine or even damaging it.

This invention is intended to overcome the problems mentioned above, particularly by limiting the possibility of mounting a filter cartridge unsuitable for correct filtering of the fluid originating from the predetermined support.

To achieve this, the purpose of this invention is a cartridge of the above mentioned type characterised in that it comprises first foolproofing means designed to cooperate with second foolproofing means connected to the predetermined support when the cartridge is mounted on the said support.

Thus, if the user attempts to mount a cartridge for which the first foolproofing means are not adapted to cooperate with the second foolproofing means, it will be difficult if not impossible to fasten this cartridge onto the predetermined support. The user will thus realise that he is attempting to mount the wrong cartridge, due to the foolproofing device according to the invention.

One or other of the following arrangements is also used in preferred embodiments of the invention:
- the cartridge extends longitudinally along a central axis and has a longitudinal end face, the first attachment device being made in the form of a thread coaxial with the central axis and fixed to the end face of the cartridge, the second attachment device being formed by a complementary thread fixed to the support;
- either the first or second foolproofing means and preferably the first comprises a recess, and the other of the foolproofing means comprises a projecting pin adapted to penetrate into the recess;
- one the said first or the said second attachment device and preferably the first attachment device is a thread tapped within the thickness of an end plate, the other attachment device being a thread made on a portion of the outside surface of a nipple, and the recess belonging to either of the said first or the said second foolproofing means is formed by a groove extending along the central axis on each side of the corresponding thread, the pin belonging to the other foolproofing means extending radially outwards from the central axis;
- the pin is fixed to the nipple, and is preferably located close to the free end of the said nipple, the threaded portion of the nipple being separated from the pin by a distance equal to at least the axial length of the tapped thread;
- the pin is formed by a spindle arranged through the nipple and with at least one end outside the said nipple;
- the groove has a predetermined transverse profile and the pin adapted to cooperate with the said groove has a complementary transverse profile;
- the first or second foolproofing means comprise at least two grooves at an angular offset by a determined angle, the other of the foolproofing means comprising at least two pins extending along directions that together form an angle equal to the said determined angle, so as to multiply the number of pairs of the first and second foolproofing means adapted to cooperate with each other;
- the end plate supporting the tapped thread has a projecting stop on one face that extends along the prolongation of one of the radial faces of the groove, and in which there is a helical ramp extending from a base as far as a top part forming the said stop, preferably provided on the face of the end plate;
- the end face of the cartridge has at least one relief that receives and positions a first annular seal that will make the seal between the said end face and the support, the said first seal having globally radial arms extending as far as a second annular seal concentric with the said first seal, that will also create a seal between the said end face and the said support.

This invention also relates to a mounting system for a filter cartridge on a predetermined support, the said predetermined support being adapted to receive a filter cartridge according to any one of the previous claims. For this mounting system, the predetermined system is preferably fixed to an engine block of an internal combustion engine and the filter cartridge is adapted to filter oil or fuel.

Other advantages and characteristics of this invention will become clear from the following description given as a non-limitative example with reference to the attached Figures in which:

FIG. 1 shows a partial longitudinal sectional view of a filter cartridge according to a first embodiment of the invention and a predetermined support that will hold it, the cartridge and the support being separated from each other;

FIG. 2 is a view similar to FIG. 1, in which the cartridge and the support are partially engaged with each other;

FIG. 3 is a view similar to FIG. 1, in which the cartridge is fixed to the support;

Identical references have been used to denote identical or similar elements in the various Figures.

Figure 4:
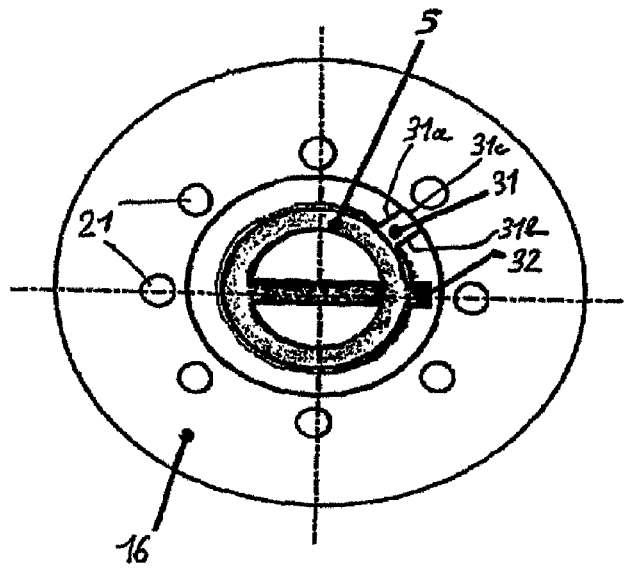
FIG. 4 is a simplified view of a cross-section according to line IV-IV in FIG. 3.

FIG. 1 partially shows a filter cartridge 1 and a support 2 in which the filter cartridge will be fitted.

In the embodiment shown, the support 2 is formed from the engine block 3 of an internal combustion engine. The support 2 also includes a tube 4 force fitted into the engine block 3 and with a portion 5, hereinafter called a nipple, that projects outside the engine block. The support 2 comprises a first channel 7 formed in the engine block 3 that will supply the filter cartridge 1 with fluid to be filtered. The support 2 also comprises a second channel 8 formed by the tube 4 that will collect the filtered fluid from the cartridge to distribute it to the engine. The fluid filtered by the cartridge 1 may be of any type, but it is particularly a lubrication oil or a fuel such as gas oil.

Figure 8:
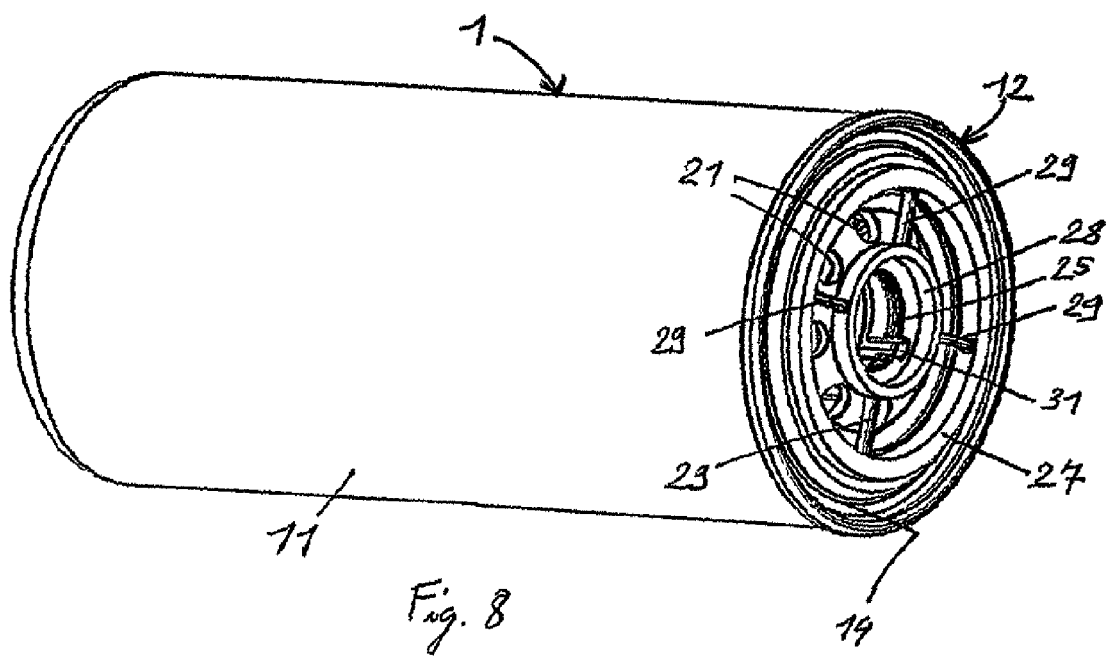
FIG. 8 is a perspective view of the cartridge according to the variant of the first embodiment.

The filter cartridge 1 is of the crimped cartridge type and comprises an external housing 11 in the form of a cup in a known manner as can be seen in FIG. 8, which extends longitudinally along a central X axis. The housing 11 formed from a metallic part has an approximately circular section. However, the housing 11 may be made in any known form. The opening of the cup-shaped housing 11 holds a cover device 12 that forms a longitudinal end face 14 of the filter cartridge 1.

More particularly, in the embodiment shown, the cover device 12 comprises an annular connecting part 15 fixed by crimping with the inner periphery of the opening of the housing 11 and an end plate 16 that extends through the opening in the housing 11 and is fixed with respect to it by the connecting part 15.

A filter element 17 is arranged on the inside of the housing 11 of the cartridge that is in the form of a cylinder arranged coaxially with the central X axis. The filter element 17 delimits a supply chamber 18 inside the cartridge that will contain the liquid to be filtered, and a collection chamber 19 collecting the liquid after it passes through the filter element 17, in other words the filtered liquid.

Figure 5:
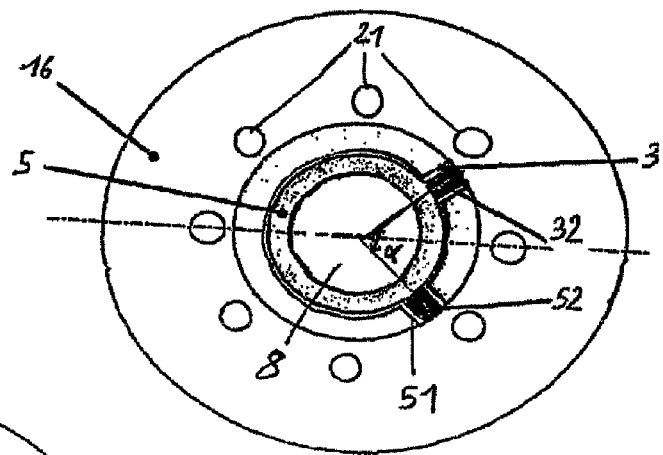
FIG. 5 is a view similar to FIG. 4 of a second embodiment of the invention.
Figure 6:
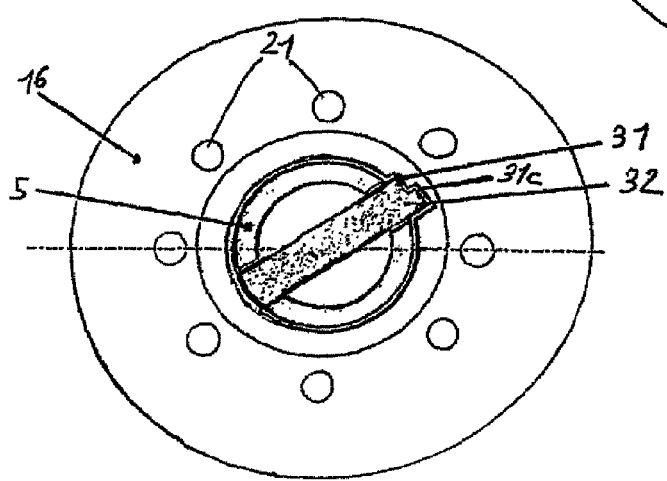
FIG. 6 is a view similar to FIG. 4 of a third embodiment of the invention.

The end plate 16 comprises a series of perforations 21 acting as liquid inlets for the filter cartridge 1, arranged around a circle concentric with the central X axis as can be seen in FIGS. 4 to 6, to enable the liquid to communicate between the first channel 7 and the supply chamber 18. Similarly, the end plate 16 comprises a central orifice 22 for communication between the collection chamber 19 and the second channel 8 through which the filtered fluid returns to the engine. But obviously, the direction of fluid circulation may be reversed, in which case the supply chamber is then located at the centre of the cartridge 1.

A tapping 25, in other words a tapped thread, passes through the end plate 16 of the filter cartridge 1 in a through cylindrical hole corresponding to the central orifice 22 in the embodiment shown, to fasten the cartridge 1 to the support 2. This tapped thread 25 forms a first device for attachment of the mounting system of the cartridge 1 onto the support 2 which is fixed to the cartridge.

The support 2 has a second attachment device 26 that is formed by a threaded portion extending along part of the outside surface of the nipple 5. Obviously, the thread 26 of the support 2 is complementary to the thread 25 of the cartridge 1 so that they can be screwed together and such that the end face 14 of the cartridge stops in contact with the support 2. Note the presence of a first annular seal 27 surrounding the orifices 21 and 22. This first annular seal 27 is pressed in contact with the docking face 3a of the engine block 3 so as to make a seal for the liquid filtered between the filter cartridge 1 and the support 2.

Systems for mounting a cartridge onto a support by screwing are usually used, and cartridges of this type are usually called "spin-on" cartridges. Such a mounting system by screwing has various advantages and particularly a low manufacturing cost, the possibility of obtaining high crimping to guarantee the seal while making a removable attachment so that a worn cartridge can be replaced. Furthermore, there is no need for a special tool for each type of cartridge. It will be noted that the structure of the first and second attachment devices (25, 26) may be inverted, with a tapped thread being made on the support 2 and a threaded nipple projecting on the end face 14 of the cartridge, or other types of attachment means may be provided.

The mounting system for the filter cartridge 1 onto the support 2 also comprises a foolproofing device, so that it is difficult if not impossible to mount an unsuitable cartridge for the predetermined support 2 associated with a given engine type that requires a filter with particular characteristics for the filtration of the oil or fuel. The foolproofing device comprises first foolproofing means 31 connected to the filter cartridge 1 and second foolproofing means 32 connected to the support 2. The first and second foolproofing means (31, 32) are adapted to cooperate with each other during assembly of the cartridge 1 onto the support 2 so that it can be fixed, as will be explained in more detail below.

In the embodiment shown, the first foolproofing means consists of a groove 31 extending longitudinally along the central X axis in the wall of the central orifice 22 that comprises the tapped thread 25 so that it opens up on each of the faces of the thick end plate 16. As can be seen better in FIG. 4, the groove 31 comprises a hollow "U"-shaped profile delimited by two opposite radial faces ($31a$, $31b$) and a circumferential face $31c$ forming the base of the "U".

The second foolproofing means is composed of a pin 32 projecting on the radially outside surface of the nipple 5 and located close to the free end of the nipple. The pin 32 extends radially with respect to the central X axis of the nipple. As can be seen in FIG. 4, the pin 32 has dimensions, in this case a diameter and a height, that enables it to pass into the recess formed by the groove 31 of the cartridge 1. As indicated in FIG. 1, the pin 32 is separated by a distance d of the threaded portion 26 of the nipple 5 by a tubular portion with an outside diameter less than the diameter of the top of the tapped thread 25 in the end plate 16 of the cartridge 1. The end plate 16 has a thickness e along which the tapped thread 25 extends. The distance d is slightly greater than the thickness e.

The pin 32 forms an integral part of a spindle 42 that extends radially through the nipple 5 and that comprises a projecting free end forming the pin 32. The spindle 42 is a simple metal rod with a circular section that therefore forms a pin 32 also with a circular section that easily penetrates into the groove 31. The spindle 42 is mounted by force fitting in two aligned reamings made through the wall of the nipple 5. Thus, the pin is very robust and is made by a very simple part fixed simply to the support 2. Consequently, this embodiment of the pin 32 is particularly inexpensive. However, it is perfectly possible to make the pin on the support 2 using a welded part or a part force fitted in a blind hole of the nipple 5, or integrally formed with the nipple 5 by moulding, particularly if it is required to minimise the pressure losses in the second channel 8.

In order to fasten the filter cartridge 1 onto the predetermined support 2, the user brings the cartridge into place by making a translation movement along the arrow F1 such that the central orifice 22 is coaxial with the nipple 5 of the support and is oriented at an angle such that the groove 31 corresponds with the pin 32. If the correspondence is not perfect, it will noted that it will be natural for the user to rotate the cartridge when the pin 32 is in contact with the periphery of the central opening 22 until the pin 32 engages in this groove 31. Due to the shape of the first and second foolproofing means adapted to facilitate cooperation between them, the pin 32 can slide freely along the groove 31 as shown in FIG. 2, until it is located in the collection chamber 19 of the cartridge. Thus, by making a pure translation movement, the nipple 5 that supports the second foolproofing means 32, the second attachment device 26 and the second channel 8 on the predetermined support 2, is engaged through the central orifice 22 that forms the first foolproofing means 31, the first attachment device 25 and the output from the cartridge 1. At the end of this translation movement, the thread 26 of the nipple 5 comes into contact with the tapped thread 25 and mounting of the cartridge is continued by making the normal screwing movement of "spin-on" type cartridges until the end face 14 is clamped in contact with the docking face 3a of the engine block as shown in FIG. 3. It will be noted that since the distance d is greater than the thickness e, the pin 32 is no longer engaged in the groove 31 when the screwing movement has to be started.

The two foolproofing means 32 related to the predetermined support 2 strongly limit the possibility of assembly of an unsuitable cartridge, for example such as the assembly of a cartridge intended to filter gas oil on a support forming a lubrication oil outlet.

The cartridge 1 is disassembled by loosening it, particularly using a chain key, and unscrewing it until the thread 26 of the nipple 5 is disengaged from the tapped thread 25 of the cartridge, in the usual manner. All that is necessary then is to vary the angle of the cartridge 1 with respect to the support such that the pin 32 corresponds with the groove 31, so that the cartridge can be completely detached from the support by a translation movement along the direction opposite to the arrow F1.

Figure 7:
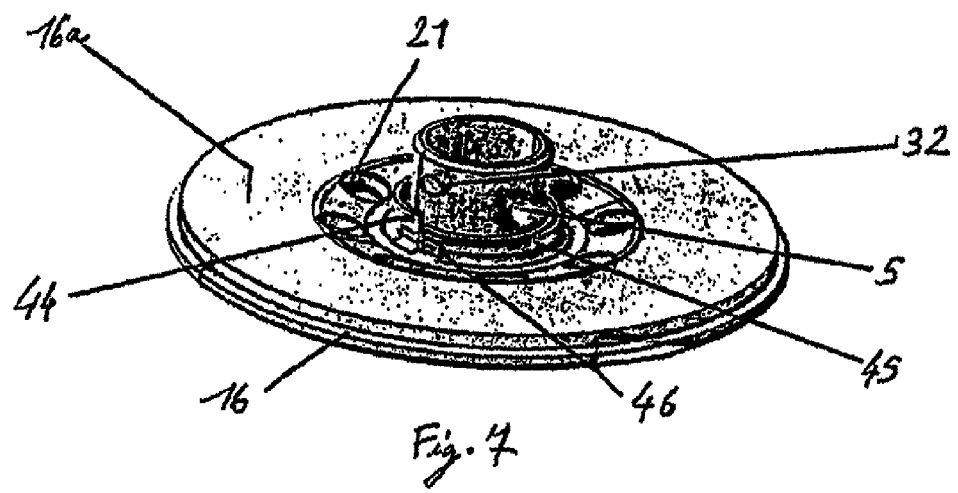
FIG. 7 is a partial view of the cartridge and the support in the assembled state according to a variant of the first embodiment.

In order to facilitate putting the pin 32 and the groove 31 into corresponding positions during disassembly of the cartridge, a stop 44 can be provided on the internal face 16a of the end plate 16 as shown on the variant of the first embodiment shown in FIG. 7. This angular indexing stop 44 of the cartridge position is formed by a ramp 45, one end of which extends along the prolongation of a lateral side 31a of the groove 31. Thus, when the pin 32 comes into contact with the stop 44, the pin 32 corresponds with the groove 31 and the filter 1 may be disengaged from the support 2 by a pure translation movement.

To further facilitate disassembly, the ramp 45 is a helical ramp extending along the inner periphery of the central opening 22 from a top part forming the stop 44 as far as a base 46 located close to the internal face 16a of the end plate and located close to the other lateral side end 31 of the groove. Thus, when the threads (25, 26) are not gripping, the pin 32 bears in contact with the top part of the helical ramp 45 and due to the tension applied on the cartridge, the cartridge is entrained by cooperation of a pin 32 with the ramp 45 to cause rotation bringing the pin 32 to make it correspond with the groove 31. It will be noted that it would be perfectly possible to provide a similar helical ramp that forms a stop on the outside face of the end plate 16 to also facilitate making the pin 32 correspond with the groove 31 during assembly of the cartridge 1.

In order to minimise the possibilities of an unsuitable cartridge being mounted on the support 2, it is preferable for the second foolproofing device related to the predetermined support 2 to be a pin 32. If the predetermined support comprises second foolproofing means made in the form of a recess, it is still possible to mount existing cartridges without foolproofing means made in the form of a projecting pin.

It is advantageous to provide different configurations of first and second foolproofing means so as to increase the number of predetermined support types that can only support cartridges adapted to a given type of a predetermined support.

In a second embodiment shown in FIG. 5, the first foolproofing means of the cartridge are composed of two grooves (31, 51) each corresponding to the groove 31 in the first embodiment, which are at an angular spacing from each other by a determined angle α, in this case equal to approximately 80 degrees. The second foolproofing means fixed to the nipple 5 of the support 2 consist of two pins (32, 52), adapted to cooperate with two grooves (31, 51) respectively, these pins extending radially along directions at an angle from each other equal to the angle α separating the grooves (31, 51). Thus, by modifying the angle α and possibly modifying the dimensions of the pins and the grooves, a large number of pairs of first and second foolproofing means can be made each of which corresponds to a determined filtration characteristic. However, if several pins are used, it is preferable that they should not be made using spindles passing through the nipple so as to limit pressure losses in the channel formed by the nipple. It will be noted that if two or more pins (32, 52) are provided, it becomes impossible to mount a cartridge with a single groove 31.

Another solution for increasing the number of pairs of first and second foolproofing means designed to cooperate with each other, is shown diagrammatically in FIG. 6. In this third embodiment, the central orifice 22 only includes a single groove 31, but this groove has a cross-section with a particular profile with a circumferential wall 31c forming the bottom of the groove in which there is an offset. The pin 32 of the nipple 5 has a profile corresponding to the profile of the groove 31 so that it can slide freely along the groove. The result is a key and lock system between the pin and the groove that can further increase the number of pairs of first and second foolproofing means.

Cooperation between the tapped thread 25 and the thread 26 is usually sufficiently leak tight to oil. But the presence of the groove 31 creates a variable sized passage for the liquid to be filtered through the tapped thread 25. Therefore, sealing means can be provided in this area, as in the case of gas oil filters. But the groove 31 may also be partially blocked by a masking element, such an elastic lip or a stop surface of the support 2 that bears in contact with the periphery of the central orifice 22.

In the first embodiment shown in FIGS. 1 to 3, and its variant shown in FIG. 8, a second seal 28 makes a leak tight joint between the output orifice 22 and the second channel 8 by being compressed between the external periphery of the central opening 22 and the portion of the engine block 3b that surrounds the bottom of the nipple 5. The second seal may be held on the cartridge 1 by any known means.

However, it is advantageous if this second seal 28 is put into position using radial arms 29 extending between the first 27 and the second 28 seals, that can be seen on the variant shown in FIG. 8. The radial arms 29 centre the second seal 28 with respect to the output orifice 22 without providing particular means on the outside face of the end plate 26. The first seal 27 is held in position by being partially engaged in an annular groove 37 formed in the connecting part 15. But there is no need to provide an additional relief in the end plate 16 to hold the second seal 28 in position, since it is held in position by the radial arms 29. It will be noted that a sufficiently rigid position is obtained, even if the first and second seals (27, 28) and the radial arms 29 are made from a single piece of elastomer.

The various embodiments described above are in no way limitative, and in particular the characteristics of the different embodiments and their variants can be combined, and attachment devices and foolproofing means with a significantly different structure can be made.

The invention claimed is:

1. A filter assembly comprising a mounted support and a filter cartridge, the cartridge extending longitudinally along a central axis, wherein said cartridge comprises:
   i) a first attachment device, adapted to come into contact with a second attachment device of said support; and ii) at least a first foolproofing element designed to cooperate with at least a second foolproofing element connected to said support when the cartridge is mounted on said support, wherein one of said first and second foolproofing elements comprises a recess that extends along the central axis, and the other of said first and second foolproofing elements comprises a projecting pin extending radially outwards from the central axis and adapted to penetrate into said recess.

2. The filter assembly according to claim 1, wherein said cartridge comprises a longitudinal end face, first attachment device being made in the form of a thread coaxial with the central axis and fixed to the end face of the cartridge, the second attachment device being formed by a complementary thread fixed to the support.

3. The filter assembly according to claim 2, wherein the end face of the cartridge has at least one relief that receives and positions a first annular seal that will make the seal between the said end face and the support, said first seal having globally radial arms extending as far as a second annular seal concentric with said first seal.

4. The filter assembly according claim 2, wherein one of said first or the said second attachment device is a thread tapped within the thickness of an end plate, the other attachment device being a thread made on a portion of the outside surface of a nipple, and wherein said recess belonging to either of said first or said second foolproofing element is formed by a groove extending along the central axis on each side of the corresponding thread.

5. The filter assembly according to claim 4, in which the pin is fixed to the nipple, and located close to the free end of said nipple, the thread of the nipple being separated from the pin by a distance equal to at least the axial length of the tapped thread.

6. The filter assembly according to claim 4, wherein the pin is formed by a spindle arranged through the nipple and with at least one end outside the said nipple.

7. The filter assembly according to claim 4, wherein the groove has a predetermined transverse profile and the pin adapted to cooperate with said groove has a complementary transverse profile.

8. The filter assembly according to claim 4, wherein one of said first or second foolproofing elements comprise at least two grooves at an angular offset by a determined angle, the other of the foolproofing means comprising at least two pins extending along directions that together form an angle equal to said determined angle.

9. The filter assembly according to claim 4, wherein the end plate supporting the tapped thread has a projecting stop on one face that extends along the prolongation of one of the radial faces of the groove, and in which there is a helical ramp extending from a base as far as a top part forming said stop.

* * * * *